(Model.)
J. A. FULWILER.
NUT LOCK.
No. 290,028. Patented Dec. 11, 1883.
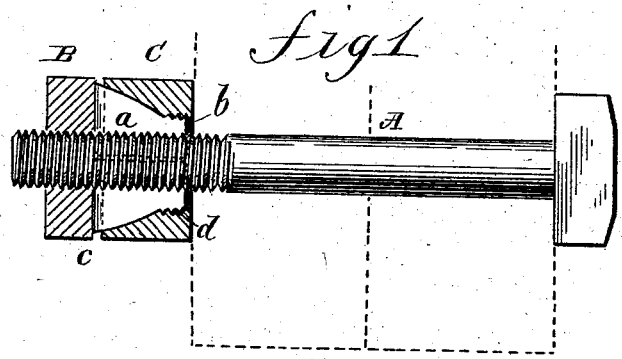
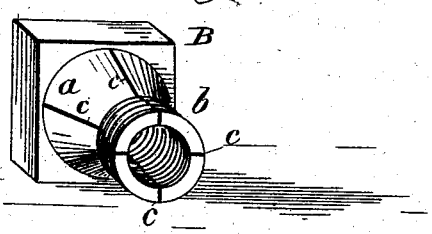
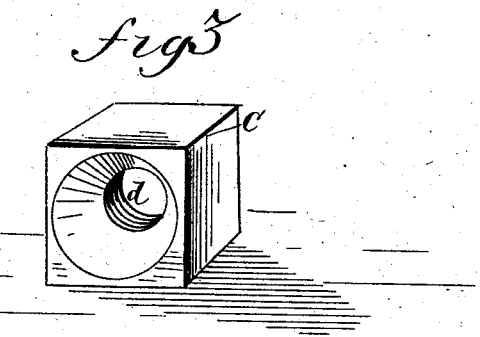
WITNESSES:
INVENTOR:
J. A. Fulwiler
BY Munn & Co
ATTORNEYS.

United States Patent Office.

JAMES ALVIN FULWILER, OF LEXINGTON, ILLINOIS.

NUT-LOCK.

SPECIFICATION forming part of Letters Patent No. 290,028, dated December 11, 1883.

Application filed May 18, 1883. (Model.)

*To all whom it may concern:*

Be it known that I, JAMES ALVIN FULWILER, of Lexington, in the county of McLean and State of Illinois, have invented a new and Improved Nut-Lock, of which the following is a full, clear, and exact description.

The object of my invention is to provide a nut-lock for ordinary bolts, for securing belt-wheels in place, collars on shafting, and proper tension for cannon pinions of watches.

The invention relates to the class of locking devices in which an extension of the nut is clamped to the threads by the action of conical or wedge surfaces, and by my improved construction I obviate the objections to such lock-nuts as heretofore made, and confine the clamping-washer between the nut and the body to which it is applied, so that the washer is prevented from moving backward, as set forth more particularly hereinafter.

Reference is to be had to the accompanying drawings, forming a part of this specification, in which similar letters of reference indicate corresponding parts in all the figures.

Figure 1 is a sectional side view of my locking-nut as applied to a bolt. Fig. 2 is a perspective view of the nut proper, and Fig. 3 a similar view of the washer.

The bolt A is of ordinary form and of any pitch or size of thread.

B is the nut, threaded throughout its aperture to fit the bolt, and formed at one side with a conical extension, $a$, which terminates in a cylindrical portion, $b$, which is threaded. The extension is formed with longitudinal incisions, $c$, of which there are preferably four.

C is the washer, corresponding in width with the extension of the nut B or nearly so, and having its aperture tapered to fit the conical surface $a$, and also with a straight portion, $d$, that fits the threaded cylinder $b$. The threads of the surfaces $b\ d$ correspond in the number to an inch with the threads on the bolt, and I prefer that the conical surface $a$ should be slightly swelled, as shown.

In use the washer C is first placed on the bolt against the surface or body to be clamped. The nut B is then screwed on the bolt and its extension $a\ b$ enters the washer until the threads on the end $b$ take the threads of the washer, and the conical surfaces coming together the nut is clamped on the threads of the bolt. The nut is held fast by the clamping action, and the washer cannot become loose for the reason that it must move back against the pressure of the body to do so. This construction gives a long threaded surface to the nut, so that the pressure cannot strip the thread. There are no threads on conical surfaces, which are difficult to cut in proper pitch and fail to clamp until perfectly matched, when all pressure possible is exerted; but, on the contrary, my smooth conical surfaces commence to clamp as soon as in contact, and increase in pressure as the washer moves up the cone.

No special form or cut of bolt is required for the nut, and the threads are alike, either right or left hand.

Having thus described my invention, I claim as new and desire to secure by Letters Patent—

The nut-lock consisting of nut B, formed with conical extension $a$, terminating in a threaded cylindrical extension, $b$, and having longitudinal incisions, and the washer C, having a conical or tapering aperture with a straight threaded portion corresponding to the threaded end of the nut, as shown and described.

JAMES ALVIN FULWILER.

Witnesses:
DAVID M. FULWILER,
THOMAS J. WADE.